United States Patent [19]
Ueda et al.

[11] Patent Number: 4,680,970
[45] Date of Patent: Jul. 21, 1987

[54] APPARATUS FOR MEASURING PRESSURE

[75] Inventors: Toshitsugu Ueda; Fusao Kohsaka; Daisuke Yamazaki; Hideo Akazawa, all of Tokyo, Japan

[73] Assignee: Yokogawa Hokushin Electric Corporation, Tokyo, Japan

[21] Appl. No.: 825,082

[22] Filed: Jan. 31, 1986

[51] Int. Cl.[4] .............................................. G01L 11/00
[52] U.S. Cl. ........................................ 73/702; 73/723
[58] Field of Search ................. 73/702, 704, 703, 715, 73/723

[56] References Cited
U.S. PATENT DOCUMENTS 2,447,817 8/1948 Rieber .................................... 73/704
4,382,385 5/1983 Paros ...................................... 73/702

FOREIGN PATENT DOCUMENTS 0595642 2/1978 U.S.S.R. ................................ 73/704
0666446 6/1978 U.S.S.R. ................................ 73/702

Primary Examiner—Donald O. Woodiel
Attorney, Agent, or Firm—Moonray Kojima

[57] ABSTRACT

A pressure measuring apparatus comprising a diaphragm to which pressure to be measured is applied and a resilient vibrator connected to the diaphragm, which acts to produce a signal based on its natural frequency relative to the pressure, wherein the diaphragm comprises a peripheral circumferential portion, a central fixing portion and a non-planar intermediate portion therebetween, with the central portion being connected to the vibrator and having its edge disposed at a non-perpendicular angle with respect to the vibrator area to which it is connected. The apparatus eliminates adverse influences due to initial distortion, hysteresis of the diaphragm and produces accurate measurements.

7 Claims, 21 Drawing Figures

FIG. 7A
FIG. 7B
FIG. 7C
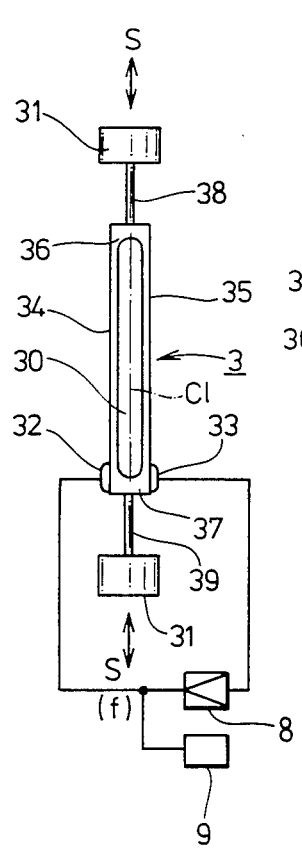
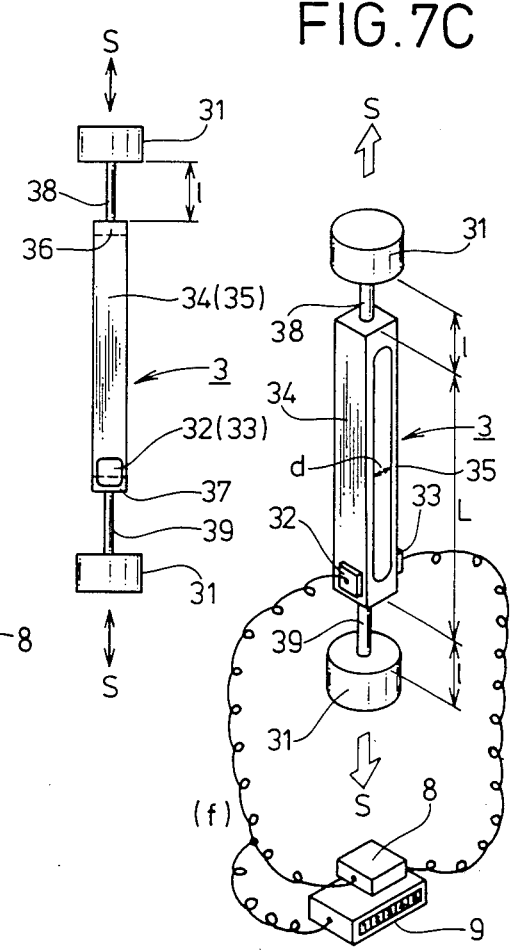

APPARATUS FOR MEASURING PRESSURE

BACKGROUND OF THE INVENTION

1. Field of Invention

This invention relates to pressure measuring apparatus which generate frequency signals corresponding to the pressure being measured; and more particularly, to such apparatus comprising a diaphragm to which pressure is applied and a resilient vibrator linked to the diaphragm for measuring the pressure by utilizing variations in the natural frequency of the vibrator.

2. Description of Prior Art

FIG. 1 is a cross sectional view of a conventional pressure measuring apparatus, such as disclosed in Japan Laid Open Pat. No. 1981-79221, wherein a diaphragm 1 is subjected to pressure $P_2$ to be measured with reference pressure $P_1$ being applied to the body shell 2 containing the vibrator 3, a tabular vibrator 3 has one end thereof secured to the inner wall of shell 2 and the other end thereof secured to diaphragm 1 and a circuit 4 detects the natural frequency of tabular vibrator 3. With this conventional apparatus, it is possible to obtain high pressure sensitivity and digital output signals corresponding to pressure to be measured which are readily adaptable for computer usage.

However, disadvantageously, this type of conventional pressure measuring apparatus has many problems. For example, the securing of vibrator 3 to diaphragm 1 presents a problem. Rectilinearity (i.e. relationship between applied pressure and generated force) is deteriorated by the distortion caused when securing the members to each other, for instance, by welding. Another example is that the natural frequency of diaphragm 1 is bound to approach that of vibrator 3. Thus, a device must be used to prevent this concurrence of frequencies. A further example is that the stress generated in a connecting parts between the diaphragm and vibrator must be minimized.

SUMMARY OF THE INVENTION

Accordingly, an obJect of the invention is to overcome the aforementioned and other deficiencies and disadvantages of the prior art.

Another object is to provide a pressure measuring apparatus capable of obtaining favorable rectilinearity and of producing high accuracy of measurement without being adversely affected by influences due to such factors as surrounding temperature and the like.

A further object is to provide a pressure measuring apparatus which resists super pressure.

A still further object is to provide a pressure measuring apparatus which is substantially free of adverse influences caused by variations in density of the surrounding gas.

The foregoing and other objects are attained by the invention which encompasses a pressure measuring apparatus comprising a diaphragm to which is applied a pressure to be measured and a resilient vibrator connected to the diaphragm and on which the resultant force associated with the diaphragm acts, wherein the diaphragm is circular in shape and comprises a peripheral circumferential portion, a central fixing portion and a non-planar intermediate portion therebetween, with the fixing portion being connected to the vibrator with its edge disposed at a substantially non-perpendicular angle with respect thereto.

BRIEF DESCRIPTION OF DRAWINGS

FIGS. 7A, 7B, 7C, depict an illustrative resilient vibrator used in the invention, with FIG. 7A being a front view, FIG. 7B being a side view and FIG. 7C being a perspective view.

DETAILED DESCRIPTION OF PREFERRED EMBODIMENTS

Figure 1:
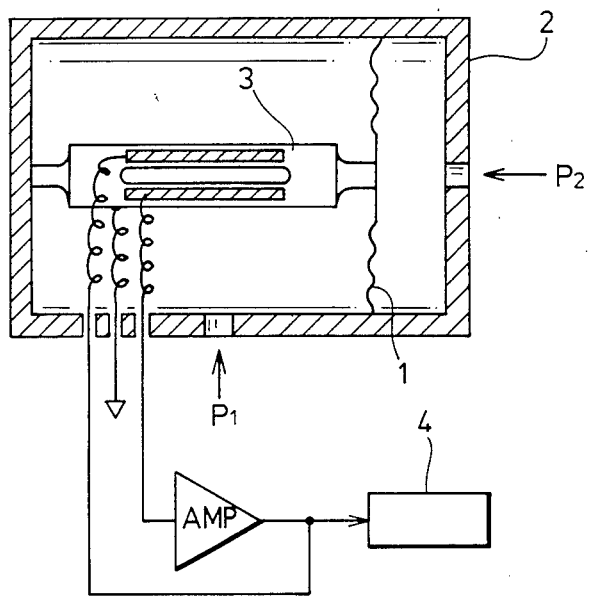
FIG. 1 is a cross sectional view depicting a conventional pressure measuring apparatus.
Figure 2:
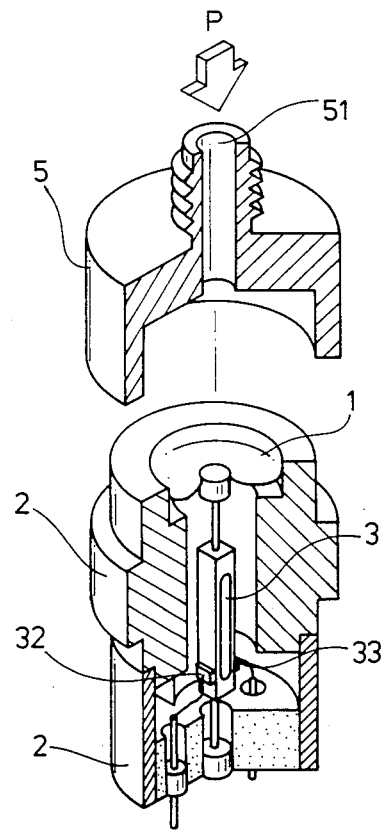
FIG. 2 is a perspective cut-away view depicting an illustrative embodiment of the invention.

Turning now to FIG. 2, the inventive pressure measuring apparatus comprises a diaphragm 1 on which a pressure P to be measured in applied, a shell or body 2, a resilient vibrator 3, which includes installing portions 31 (see FIG. 3) at either end thereof, and a cap 5 which has an intake 51 for leading the pressure P therein, and which is hermetically mounted on body 2.

Figure 3:
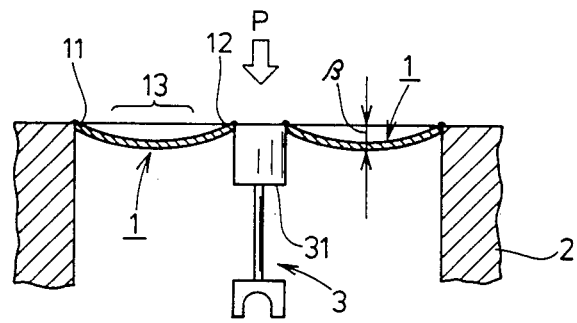
FIGS. 3 and 4 are cross sectional partial views of illustrative diaphragms.

As shown in FIG. 3, diaphragm 1 comprises a peripheral circumferential portion 11, a central fixing portion 12 and an intermediate non-planar portion 13 therebetween. What is meant by non-planar is that intermediate portion 13 is offset by a distance $\beta$. The non-planar distance $\beta$ is measured at the distance farthest from the plane. In the arc shape shown in FIG. 3, $\beta$ is measured from the planar surface to the bottom of the arc. The non-planar portion 13 may take any suitable shape, such as circular arc, a parabola or circle or the like. These non-planar shapes may be formed by, for example, a contracting process, electroforming or the like. The periphery portion 11 is secured, such as by welding, to shell 2, and the fixing portion 12 is secured, such as by welding, to installing part 31 of vibrator 3. As depicted, the peripheral portion 11 and fixing portion 12 are disposed to have at the edges thereof the surfaces thereof disposed at substantially non-perpendicular angles, to the body 2 and part 31, respectively. In FIG. 3, this disposition is angular, and in FIG. 4, the disposition is parallel.

Figure 4:
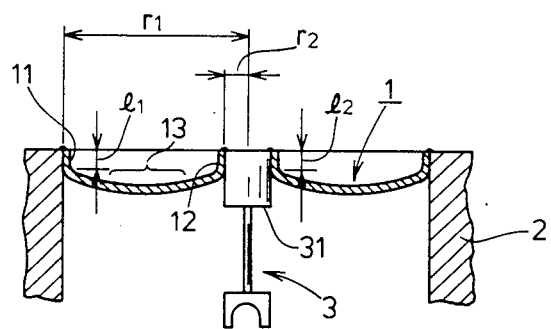

In FIG. 4, diaphragm 1 has extended lips, or rising edge portions, at the peripheral portion 11 and fixing portion 12. The rising edge portions have dimension $l_1$, $l_2$, which are measured in the manner depicted in FIG. 4. The rising edge portions enable suitable welding of the diaphragm to body 2 and vibrator 3, without producing initial distortion during fabrication, and the resulting undesired adverse effects caused thereby.

The degree of positional distortion caused by welding the diaphragm to the shell and vibrator, exerts an adverse influence on the diaphragm. It was found that this adverse influence can be reduced if the height l of the rising edge portion is set to be 70% or more of the l obtained from the following equation when the rising edge portion is welded to the body and vibrator.

$$l = 1.8 \cdot r \cdot \sqrt{\frac{t}{r}}$$

wherein r is the radius extending to rising edge portion concerned and t is the thickness of the diaphragm. This can be confirmed in terms of strength of materials.

Returning to FIG. 2, vibrator 3 comprises a pair of vibrating pieces disposed in parallel to each other with connecting ends at either end thereof, a vibration detecting means 33 and an exciting means 32 (which both can be of piezoelectric material) affixed to the vibrating pieces. Thus, the vibrator is self oscillated.

When pressure P to be measured is applied to diaphragm 1 from above, as indicated by arrow P, diaphragm 1 generates a force which corresponds to the pressure P applied thereto. The thus produced force incident to diaphragm 1 acts as an axial force on vibrator 3, thereby to vary its natural frequency. Thus, it is possible to measure pressure P by ascertaining the variations in the vibrator's natural frequency.

If the inside (i.e. the side of body 2 on which the vibrator 3 is disposed) of shell or body 2 is equalized to atmospheric pressure, as a reference pressure, the pressure to be measured P can be directly measured. If the reference pressure is nil, that is the inside is evacuated to form a vacuum, then the absolute pressure can be estimated. Furthermore, if the reference pressure to be applied inside the shell is any other value, it is possible to measure a differential pressure between the pressure to be measured and the pressure applied to the inside of the shell to the vibrator.

Figure 5:
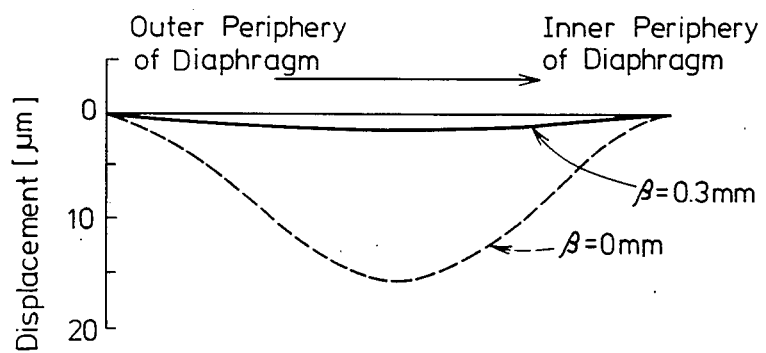
FIGS. 5 and 6 are diagram depicting effect on displacement and stress, respectively, of pressure applied to the diaphragm.
Figure 6:
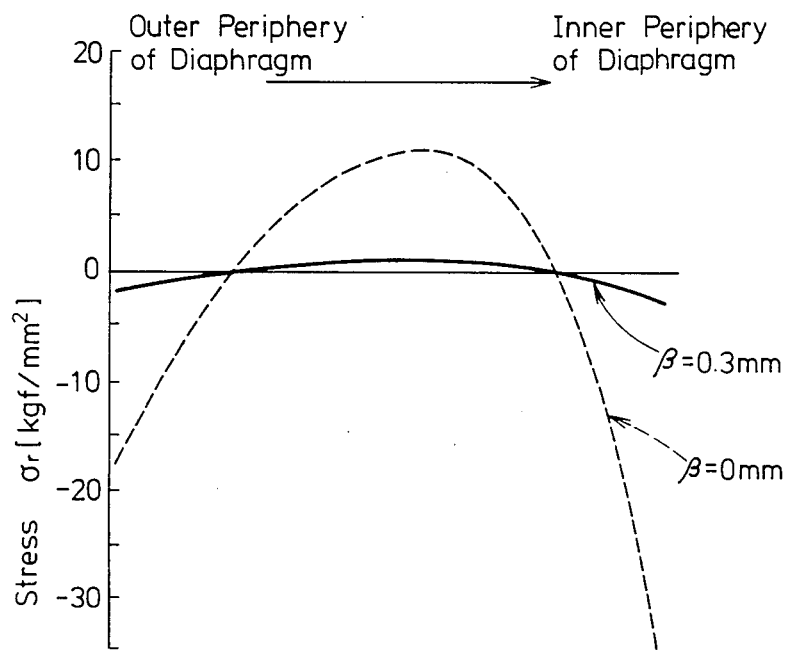

FIGS. 5 and 6 are diagrams relating to effect on displacement and stress of the diaphragm 1 depicted in FIG. 3 as compared with a reference diaphragm. The FIG. 3 diaphragm (see the unbroken line) had a non-planar part having a dimension β of 0.3 mm and a thickness of 0.1 mm. A pressure of 2 Kgf/mm² was applied to the diaphram. Numerical calculations were made, and plotted on the graphs of FIGS. 5 and 6. The reference diaphragm (see broken line) was a plane plate (i.e. β=0 mm) having a uniform thickness of 0.1 mm, and the same pressure of 2 Kgf/mm² was applied and numerical calculations made and plotted on the graphs of FIGS. 5 and 6.

It can be readily understood from the arithmetic results depicted in FIGS. 5 and 6, that the FIG. 3 diaphragm provided with a non-planar part is small in both displacement and stress as compared with the tabular diaphragm of the prior art. It is further evident that the stress in the central fixing edge portion 12 secured to vibrator 3 and in the peripheral portion 11 secured to the shell 2 is less than that in the tabular diaphragm. The inventors have discovered, however, that the angular positioning of the edge portions 12, 11, with respect to the vibrator 3 and body 2, can be improved.

FIG. 4 depicts an improved diaphragm which comprises lip or rising edge portions formed at the peripheral portion and at the fixing portion. These lip portions are substantially parallel to the shell 2 and vibrator 3, when considered from the standpoint of the surfaces of the lip portions and with respect to the surfaces of the body or shell 2 and vibrator 3. This is depicted clearly in FIG. 4. It was discovered that this particular configuration enabled the respective parts to be welded together without any problem of placement distortion of the parts, and that hence adverse effects caused by curvature of the pheripheral and fixing portions are substantially eliminated. Also, stress acting on the diaphragm is decreased because only tensile and compression forces are present at those parts. If the distances $l_1$, $l_2$ of the rising portions are are at or more than 70% of the product of 1.8r t/r, it is possible to reduce the adverse influence caused by distortion incident to the welding operation used to attached together the edge portion (i.e. the peripheral and fixing portions) to the shell and vibrator.

Advantageously, the invention undergoes relatively low stress and is subjected to extremely small adverse influence of hysterisis, and the like, and suffers only small initial distortion at the time of fabrication. The invention, advantageously, measures pressures with favorable rectilinearity and high accuracy. Moreover, the invention employes diaphragms which have relatively great flexural rigidity and hence it is possible to make the natural frequency of the diaphragm higher than that of the vibrator. Thus, the operation of the invention is more stable.

Turning now to FIGS. 7A, 7B, 7C, resilient vibrator 3 is symmetric with respect to a central axis Cl, and comprises a pair of tabular vibrating pieces 34,35 disposed parallel to each other and connected to each other by end pieces 36,37. Vibrator 3 may be formed by cutting a square bar, for example, to form a vibrator which is symmetric with respect to the center of a slot which is cut in the longitudinal direction. Consequently, a pair of vibrating pieces 34,35 are formed in parallel to each other and a pair of end pieces 36,37 defined as residual end portions left when slot 30 has been formed.

It is desirable that distance d between vibrating pieces 34, 35 be more than 1.5 mm. Flexure members 38,39, which are circular cylindrical in shape, are connected to end pieces 36,37. Installation members 31 (also called fixing members) are linked to the other ends of flexure members 38,39. These installation members 31 are also circular cylindrical in shape. A force S, which is to be detected or measured, is applied through the intermediary of the flexure members 38,39, to each of vibrating pieces 34,35. The length l (which coincides with the distance between the ends 36,37 36,37 and the respective installation members 31) of the flexure members 38,39 is determined to be substantially equal to λ/4 with respect to wave length λ of the vibrating frequency of the vibrating pieces 34,35.

An excitation device 32 is mounted on vibrating piece 34. A vibration detecting mdevice 33 is mounted on vibrating piece 35. These devices 32,33 together with amplifier 8 and vibrator 3 are preferably combined into a self oscillating circuit. The excitation and vibration detecting devices 32,33 may comprise, for example, piezoelectric elements. A frequency measuring device 9 is used for measuring the vibrating frequency of the oscillating circuit which includes the vibrator 3.

Force S shown as an axial force corresponding to the applied pressure is imparted via members 31 and flexures 38,39 to vibrator 3. Suppose force S is variable, then resonant frequency f of vibrator 3 is expressed by the following equation (1) when the following condition 1(A) applies:

$$1 >> K_2 \cdot \frac{L^2}{EI} \cdot S \qquad 1(A)$$

$$f = \frac{K_1}{2\pi L^2} \sqrt{\frac{E \cdot I_g}{\rho \cdot A}} \left(1 - K_2 \cdot \frac{L^2}{E \cdot I} \cdot S\right)^{\frac{1}{2}} \qquad (1)$$

wherein L is the length of each of the vibrating pieces concerned, E is the modulus of longitudinal elasticity of the vibrating piece, I is the geometric moment of inertia relative to the principal axis which is perpendicular with respect to the oscillating direction, g is the gravitational acceleration, $\rho$ is the density of the vibrating piece, A is the sectional area (a constant) of the vibrating piece, S is the axial force (that is force corresponding to applied pressure, and compressive force made positive), and $K_1$, $K_2$ are constants determined by the conditions under which the vibrator is sustained by the oscillating moment.

As can be seen from equation (1), since resonant frequency f of vibrator 3 varies in proportion to force S, the vibrating frequency of the oscillation circuit also changes. Thus, if vibrating frequency f is measured by frequency measuring device 9, it is possible to obtain a value of the axial force S applied to vibrator 3, thereby measuring pressure P which is exerted on diaphragm 1.

Figure 8:
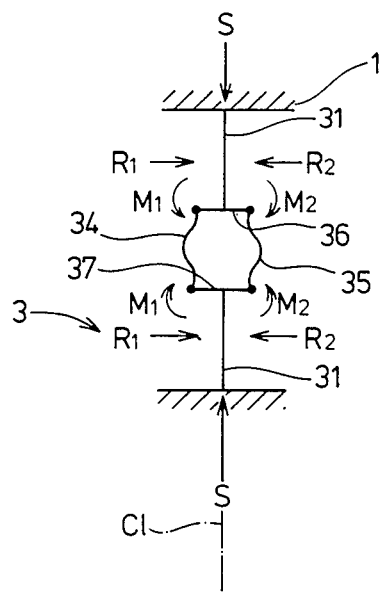
FIG. 8 is a representational diagram depicting a representational fundamental structure of the embodiment of FIGS. 7A, 7B, 7C.

FIG. 8 shows representationally, the fundamental structure of the resilient vibrator shown in FIGS. 7A,7B,7C. In the structure, if a pair of vibrating pieces 34,35 are the symmetrical modes at which these pieces oscillate symmetrically with respect to the central axis Cl, the vibrating pieces 34,35 oscillate in directions which are opposite to each other. Reaction forces $R_1$, $R_2$ are created at connecting points between vibrating pieces 34,35 and end pieces 36,37. The reaction forces $R_1$, $R_2$, as well as moments $M_1$, $M_2$, act contrari-wise with respect to each other, whereas they are equal in force. Thus, the condition $R_1 = -2$ and $M_1 = M_2$ are established. Reaction forces $R_1$, $R_2$ and moments $M_1$, $M_2$ are mutually offset at end pieces 36,37, thereby to generate no forces at the connecting points between vibrator 3 and installation members 31.

As a result, there is no probability of vibrating energy leaking out of the side of vibrator 3 to the end parts thereof on which the installation members 31 are disposed. These effects result when the right and left vibrating pieces 34,35 are formed symmetrically. However, perfect symmetry is almost impossible to attain. Thus, the vibrating energy, however slight, tends to leak out. The invention selects configurations and lengths of the flexure members 38,39 to prevent substantial leakage of vibrating energy. For example, in the resilient vibrator of the invention, flexure members 38,39 are of circular cylindrical shape, and have lengths which are about $\lambda/4$. The effects of these criteria will be further described hereinbelow in connection with FIGS. 9 and 10.

Figure 9:
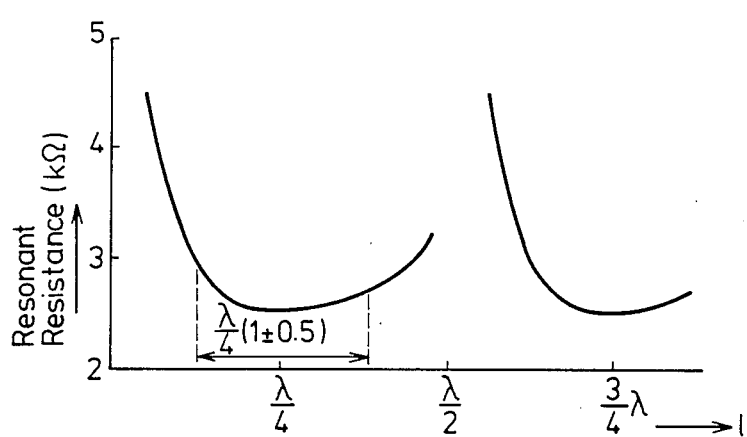
FIG. 9 is a diagram depicting the relationship between flexure length and resonant resistance produced by the vibrator of FIG. 8.

FIG. 9 shows the resonant resistance (which is inverse in proportion to Q) when the cross sectional shape of the flexure member is circular and the length 1 is made variable within a certain range. Thus, if the length range is determined to be $1 = \lambda/4$ multiplied by $(1 \pm 0.5)$, the resonant resistance is decreased. On the other hand, an ascending tendency is found in regard to Q.

The natural frequency $\omega$ of vibrator 3 and length 1 of one of the flexure members 38,39 can be expressed by the following formula (2) using the condition $R = 1/A$:

$$l = \alpha \left(\frac{R}{\omega}\right)^{\frac{1}{2}} \cdot \left(\frac{E}{\rho}\right)^{\frac{1}{2}} \qquad (2)$$

wherein $\alpha$ is a constant, and the other notations are defined with respect to equation (1).

Table 1, hereinbelow, shows Q values relative to length of the flexural members, where axial force S is zero in relation the embodiment of FIGS. 7A,7B,7C.

TABLE 1

| Example No. | $l/l_o$ | $Q/Q_o$ |
|---|---|---|
| 1 | 0.56 | 0.74 |
| 2 | 0.60 | 0.74 |
| 3 | 0.63 | 0.90 |
| 4 | 0.80 | 0.97 |
| 5 | 1.00 | 1.00 |

At the preferred length $l_o = \lambda/4$, and $Q_o = Q$ of $\lambda/4$.

The sectional configuration of flexure members 38,39 is selected to be circular. Such a configuration also accrues advantages in facilitating manufacturing. When the length of the flexure embers 38,39 is selected to be $\lambda/4$, with $\lambda$ being the natural frequency of the vibrator 3, Q can be increased and hence conversion sensitivity is increased. However, the natural frequency of the vibrator can be changed by the axial force S. Thus, it was found if axial force S is a tensile force, it is desirable that the length be shorter than $\lambda/4$, whereas if the axial force S is a compressive force, then the length should preferably be longer than $\lambda/4$.

Figure 10:
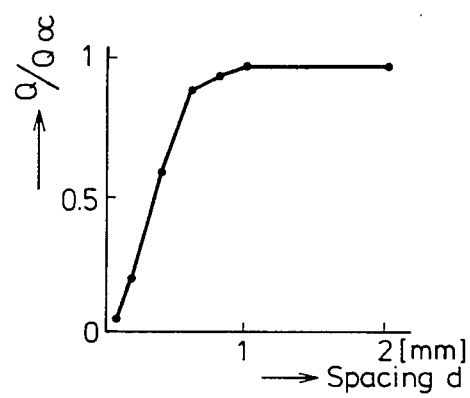
FIG. 10 is a diagram depicting the relationship between the spacing between a pair of parallel vibrating pieces and the Q value.

FIG. 10 shows the relationship between Q and spacing d between the vibrating members 34,35, when vibrator 3 is oscillated in the air. From the graph, it can be seen that favorable results are attained when the spacing d is 1.5 mm or more.

In the FIGS.7A,7B,7C embodiment, the vibrator has excitation device 32 and vibration detecting device 33 directly formed at predetermined places on the respective vibrating pieces 34,35. These devices may be thin films of piezoelectric material, and may be formed on the pieces by such processes as vapor deposition, sputtering or other similar methods. Advantageously, the invention, having such devices placed thereon in such manner, has a much higher Q value than priorly obtained in the prior art, and the cost of production has been substantially reduced. The vibrator may be formed of piezoelectric material, such as of a crystal or the like. Also, electrodes may be deposited on the vibrator. Thus, the entire apparatus may be fabricated at low cost, increased efficiency and be of high accuracy.

Figure 11:
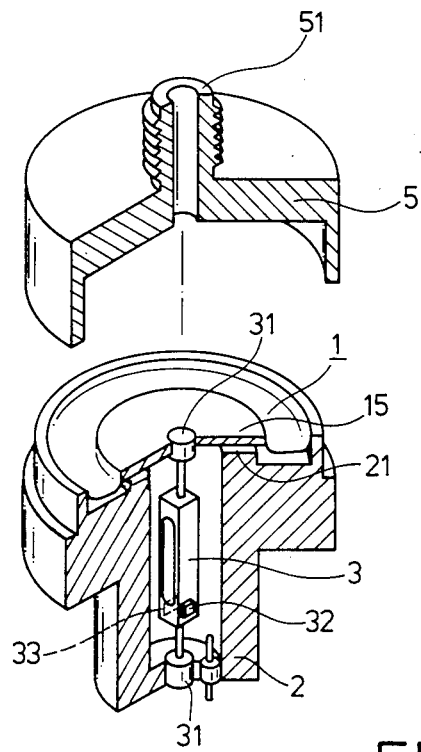
FIG. 11 is a perspective cut-away view depicting another illustrative embodiment of the invention.

Turning now to FIG. 11, a relatively thick disk 15 is fixed to the inner peripheral portion of diaphragm 1 and one end of resilient vibrator 3 is firmly secured to disk 15. In addition, a back plate 21 is disposed in shell 2 in close proximity to disc 15 as depicted.

Figure 12:
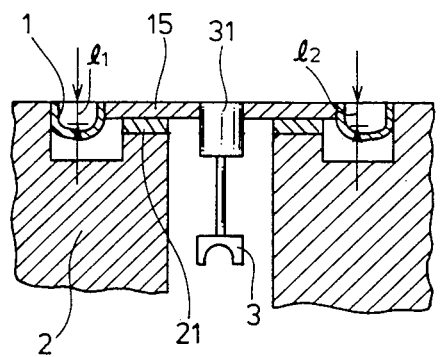
FIG. 12 is a partial cross sectional view depicting another diaphragm.

FIG. 12 shows a sectional configuration of diaphragm 1 wherein rising edge portions or lips are shown having dimensions $l_1$, $l_2$. These distances $l_1$, $l_2$ are relatively small. These rising edge portions, respectively, are provided at the circumferential portion (secured to shell 2) and at the fixing portion (secured to disk 15). With this configuration, there is substantially no adverse effect caused by positional deviation, which may result when the edges are secured to the shell and disk. Also, the rising edge portion or lip enables stress free welding of the edge portion to the shell and disk and, without any positional distortion or deviation.

In this embodiment, immediately when the pressure to be measured is applied through pressure intake 51, both diaphragm 1 and disk 15 generate forces corresponding to the applied pressure. The produced forces act on the vibrator as axial forces, thereby to vary the natural frequency of the vibrator. The pressure P to be measured can thus be measured by detecting the variations in natural frequency.

It is well known that the effective area of a diaphragm (which is the overall surface of which is formed of a thin plate) becomes approximately $\frac{1}{3}$ of the total area. The effective area is expressed by the following $$Ae \approx \tfrac{1}{3}(Ddo/2)^2\pi \quad (3)$$

wherein Ae is the effective area of the diaphragm and Ddo is the outer diameter.

In this embodiment, however, diaphragm 1 is provided with disk 15 which is secured to the inner periphery of the diaphragm, so that the effective area is obtained as follows $$Ae \approx [(Dp/2)^2 + \tfrac{1}{3}\{(Dd/2)^2 - (Dp/2)^2\}]\pi \quad (4)$$

$$\approx \tfrac{1}{4}\pi Dd^2[(Dp/Dd)^2 + \tfrac{1}{3}\{1 - (Dp/Dd)^2\}]$$

wherein Dp is the outer diameter of disk 15 and Dd is the outer diameter of diaphragm 1 including disk 15 disposed on the inside thereof.

If the effective areas are equalized according to formula (3) and (4), a ratio between the outer diameter of the diaphragm formed of a thin plate only and of the diaphragm having the disk 15 disposed on the inside thereof is given by the following $$Ae_1 = Ae_2 \quad (5)$$

$$= \tfrac{1}{3}(Dd/2)^2\pi = \tfrac{1}{4}\pi Dd^2[(Dp/Dd)^2 + \tfrac{1}{3}\{1 - (Dp/Dd)^2\}]$$

$$= Dd/Ddo$$

$$= \sqrt{\tfrac{1}{2}(Dp/Dd) + 1}$$

Figure 13:
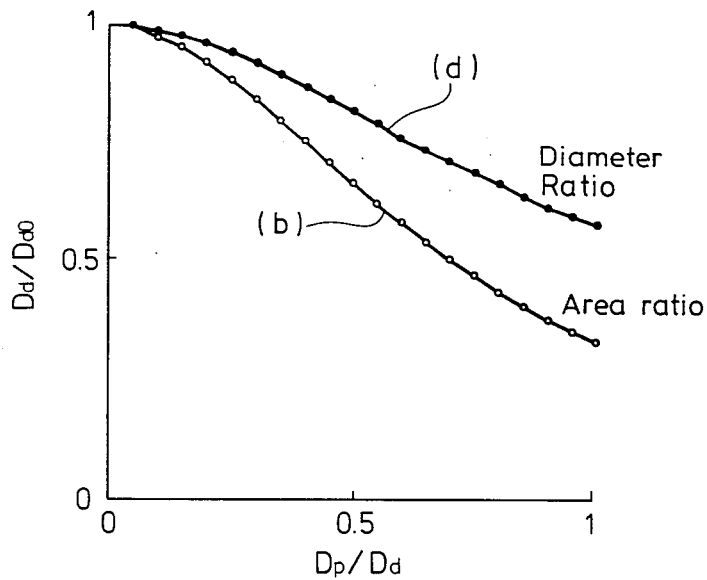
FIG. 13 and FIG. 14 are diagrams depicting characteristics of the embodiment of FIG. 11.

FIG. 13 is a graph wherein values obtained by equation (5) are plotted. The ordinate shows ratios obtained by comparing the diameter of the diaphragm which includes the disk and the diaphragm part made of the thin plate only. The abscissa shows ratios of disk 15 to diaphragm 1 provided along the outer periphery thereof. In FIG. 13, curve (d) indicates the diameter ratio and curve (b) indicates the area ratio.

The graph shows that if the diameter of disk 15 is equal to 50% of the diameter of the entire diaphragm, the outer diameter comes to 82% (area ratio is approximately 67%) as compared to that of the diaphragm formed only of the thin plate. On the other hand, if the diameter of disk 15 is equal to 80% of the diameter of the diaphragm 1, the outer diameter can be reduced to 66% (area ratio is about 44%) of the diameter of the diaphragm formed only of the thin plate.

Generally, the resonant frequency of the diaphragm decreases as the diameter of the diaphragm increases. This presents the possibility of the resonant frequency of the diaphragm coinciding with the resonant frequency of the vibrator. In that case, the characteristics of the vibrator will deteriorate.

In the invention, however, since disk 15 is disposed along the inner periphery of the diaphragm 1, the difference between the inner and outer diameters of the diaphragm is reduced, thus making it possible to restrain the resonant frequency from declining.

If the diaphragm comprises only the thin plate, that is without the use of disk 15, together with the back plate, the surface on which the pressure is applied may become undulate and the back plate may also become wavy. In this embodiment, such disadvantages do not take place. Also, the back plate is simple to fabricate and manufacture together withe the other structures due to the tabular nature of the disk 15.

Figure 14:
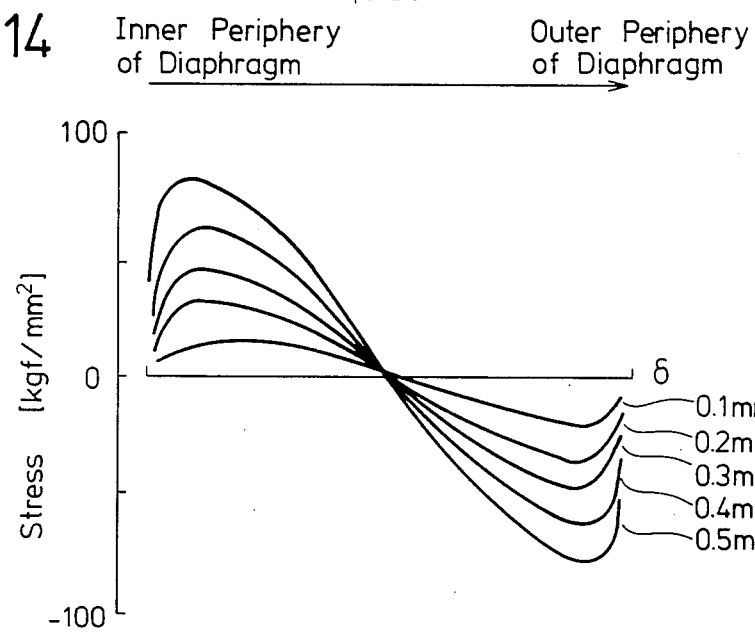

FIG. 14 shows characteristics relative to stress in diaphragm 1 when spacing δ between back plate 21 and disk 15 is defined as a parameter. In the graph, the ordinate refers to stress (tensile and compressive forces) produced in the diaphragm. The abscissa refers to the position vis-a-vis inner and outer periphery of the diaphragm. Diaphragm 1 is made of stainless steel, in one embodiment, and has an outer diameter of 30 mm and an inner diameter of 18 mm, and a plate thickness of 0.1 mm. A 10 fold super pressure was applied as high as a measurement pressure of 0.2 Kgf/cm² as defined as the reference base. Calculations of the stress were made at respective positions along the diaphragm using commonly known arithmetic equations, and the results were plotted in FIG. 14. The graph shows that the tensile stress is generated in the inner periphery, whereas compressive stress is generated in the outer periphery, when the center or close thereto of the diaphragm is the demarcation. As shown in FIG. 14, the spacing between disk 15 and back plate 21 may be 0.3 mm or less. The critical spring value of stainless steel is about 50 Kg/mm². The graph shows greater spaces to produce greater stress.

According to this embodiment, since a disk is provided along the inner periphery of the diaphragm, it is feasible to diminish the outer periphery thereof without decreasing the effective area as compared with a diaphragm in which a thin plate only forms the entire diaphragm. Thus, it is also possible to miniaturize the entire apparatus and simultaneously prevent decline in the resonant frequency of the diaphragm. Moreover, diaphragm 1 has rising edge portions having predetermined heights which are formed along the inner and outer periphery thereof, so that the apparatus is not adversely affected by positional distortion or deviation often produced during welding of the parts. In addition, advantageously, the embodiment facilitates welding due to the lip portions being in the configuration shown. Moreover, the back plate enables manufacture of an apparatus which is protected from adverse effects of super pressure.

Figure 15:
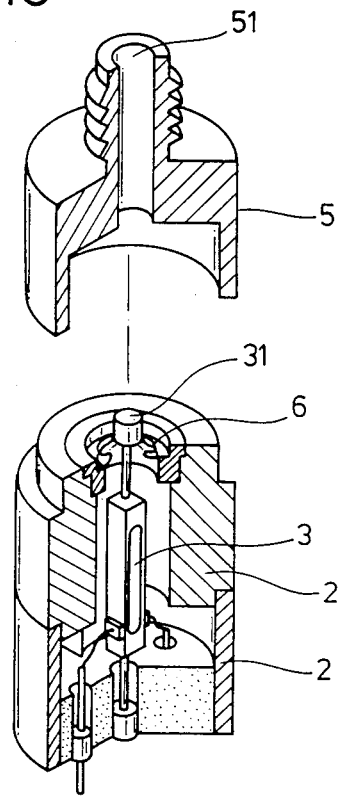
FIG. 15 is a perspective cut-away view depicting still another illustrative embodiment of the invention.
Figure 16:
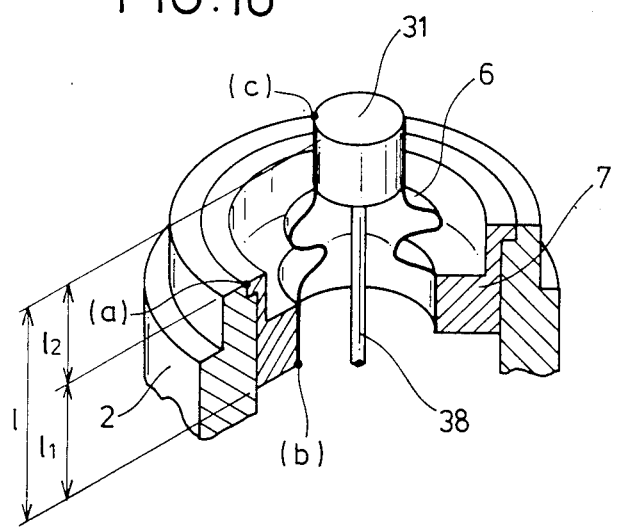
FIG. 16 is a partial perspective cut-away view depicting further details of principal portions of the embodiment of FIG. 15.

Turning now to FIGS. 15 and 16, a bellows 6, instead of a diaphragm, has applied thereto the pressure to be measured. An annular metallic member 7 is disposed inside shell 2 with the outer pheriphery portion being hermetically secured at point (a) to shell 2. This annular metallic member 7 is hermetically secured at point (b) at its lower inner periphery portion to bellows 6. Bellows 6 includes a through hole formed in the central portion thereof through which resilient vibrator 3 is installed. Installation member 31 is fit in the through hole and is hermetically secured at its periphery portion at point (c) to bellows 6. In this embodiment, bellows 6 is distorted when a pressure is applied to the bellows 6, and the forces corresponding to the pressure is imparted to the vibrator 3.

When the circumferential (i.e. vis-a-vis the axis of the vibrator) temperature varies, different compressive and expansive forces result on the vibrator, causing certain errors in readout. This is due to differences in linear coefficient of expansion of the bellows, body and vibrator. In this embodiment, annular metallic member 7 is provided between bellows 6 and body 2 and prevents the differences in expansion coefficients from affecting the pressure measurement readout, as explained hereinbelow.

A force $\Delta F$ acting on the vibrator and which is caused by thermal variations, can be calculated by the following $$\Delta F = \{\delta - l(\alpha n - \alpha e)\Delta t\} \cdot (1 + e\Delta t) K \quad (6)$$

wherein $\delta$ is the installation error (mm), l is the length (mm) of the bellows, $\Delta t$ is the thermal variation (°C.), K is the spring constant (Kgf/m) of the bellows, $\alpha n$ is the coefficient of linear expansion ( /°C.) of the bellows, e is the coefficient of thermal elasticity ( /°C.) of the bellows and $\alpha e$ is the coefficient of linear expansion (/°C.) of the vibrator and body.

In case the bellows is formed of nickel of high purity, the body and vibrator are made of Ni-Span-C, and the bellows is directly secured to the body without the use of annular metallic member 7, the error (shown as $\Delta F$ in equation (6)) incident thereto is computer as follows. Assume that the length of the bellows is 5.5 mm, the spring constant K of the bellows is 3.2 Kgf/mm, the coefficient of linear expansion n of the bellows is $13.3 \times 10^{-6}/°C.$, the coefficient of thermal elasticity e of the bellows is $-430 \times 10^{-6}/°C.$ and the installation error $\delta = 0$ mm, then through calculation using equation (6), the force per 1° C., given by $\Delta F = 8.4 \times 10^{-5}$ Kgf acts on the vibrator. In this case, the thermal coefficient of the pressure measuring device is +10.6 ppm/°C.

On the other hand, annular metallic member 7 is, as shown in FIG. 16, interposed between bellows 6 and body 2. Where the length l of bellows 6 is similarly 5.5 mm and metallic member 7 is made of stainless steel JIS SUS316 (coefficient of linear expansion = $16.0 \times 10^{-6}/°C.$), the length $l_1$ is so determined as to offset the differences in flexibilities (that is degree of deformation caused by differences in coefficient of linear expansion). The $l_1$ can be obtained as follows $$l_1 \cdot \alpha a = l \cdot \alpha n - l_2 \cdot \alpha e \quad (7)$$

$$l_1 = \{(\alpha n - \alpha e)/(\alpha a - \alpha e)\} l \quad (8)$$

If the length of the stainless steel is calculated by equation 8, $$l_1 = \{(13.3 - 8.5)/(16.0 - 8.5)\} \times 5.5 = 3.52$$

Thus, when the length of the stainless steel is 3.52 mm, it is feasible to offset the differences in flexibilities of the bellows and vibrator and body (due to differences in coefficient of linear expansion). The metallic member 7 thus offsets the differences in coefficient of expansion of the different parts, and the invention eliminates errors which may be caused by differences in linear expansion coefficients of the different parts.

Figure 17:
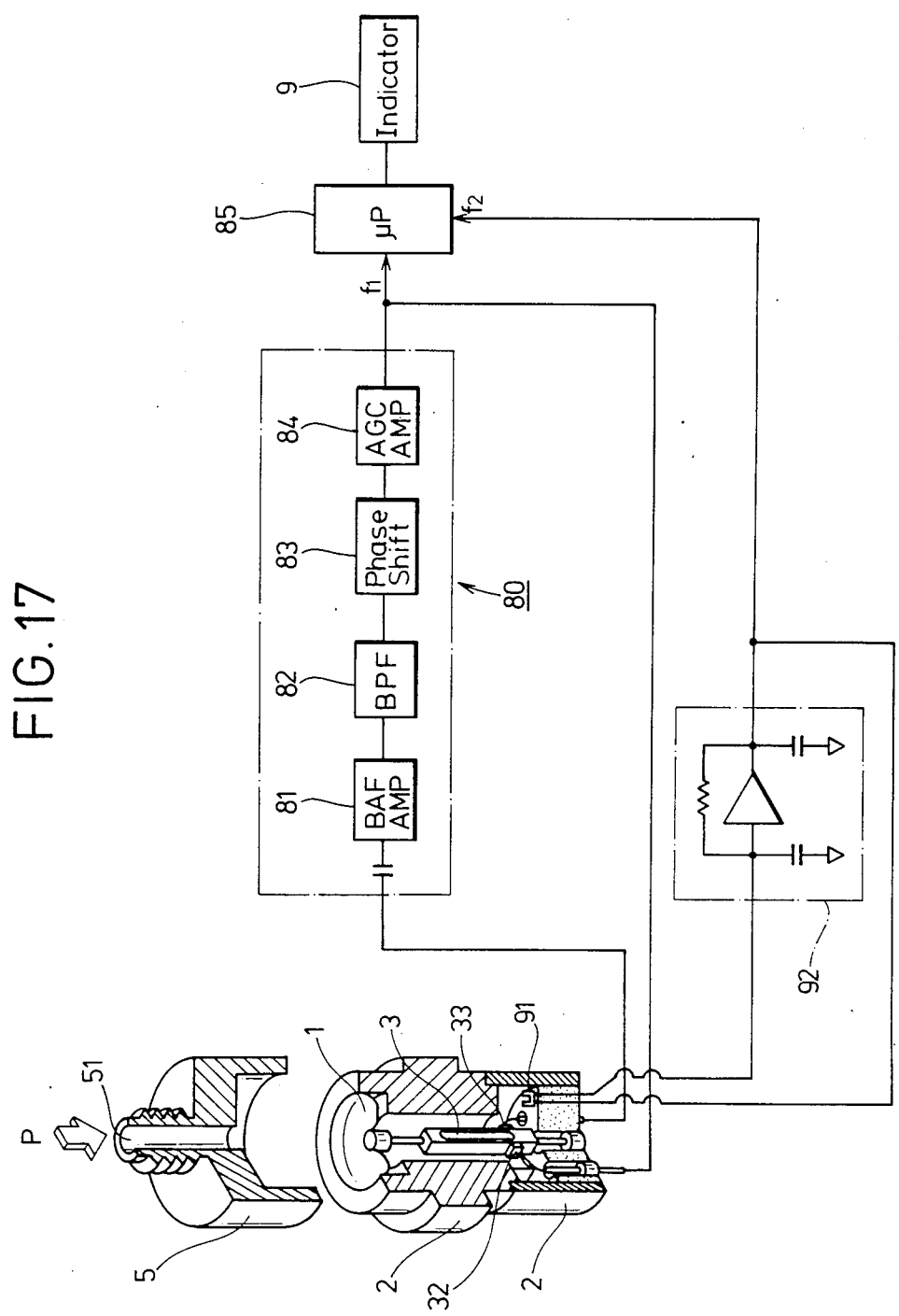
FIG. 17 depicts a pressure measuring apparatus using a compensating device and circuit diagram of associate equipment used in connection therewith.

Turning now to FIG. 17, a signal transmitted from vibration detecting device 33 mounted on vibrator 3 is applied to a buffer amplifier 81 wherein such signal is amplified. Then, the signal is applied via band pass filter 82, phase shifter 83 and AGC amplifier 84, to exciting device 32. Buffer amplifier 81, bandpass filter 82, phase shifter 83 and AGC amplifier 84, combined with the resilient vibrator 3, constitute a self-oscillation circuit 80, having its natural frequency at which the vibrator 3 vibrates. A frequency signal f1 sent out from self-oscillation circuit 80, is applied to a signal processing circuit comprising, for example, one or more microcomputers. A tuning fork oscillator 91, formed, for example, of a crystal, is provided inside shell 2 in which the vibrator 3 is installed, and vibrates at its natural frequency by actuation by oscillation circuit 92. As will be explained, the oscillator 91 forms a compensating device to compensate for the adverse effects of circumferential gas.

A frequency signal f2, emitted by self-oscillation circuit 92 is applied to signal processing circuit 85. The natural frequency f1 of vibrator 3 basically corresponds to the pressure which is applied to diaphragm 1. This natural frequency, however, is affected to some degree, by the density of the gas surrounding the vibrator, which will be referred to as circumferential gas.

The tuning fork oscillator 91 is provided to compensate for adverse effects caused by the density of the circumferential gas. Frequency signal f1 emitted from circuit 80 can be expressed as below equation (9), taking into consideration the density of the circumferential gas $$f1 = f10/\sqrt{1 + A \cdot \rho} \quad (9)$$

wherein f10 is the resonant frequency of the resilient vibrator 3 under vacuum and A is a constant and $\rho$ is the density of the circumferential gas. If the influence of the density of the circumferential gas is considered, frequency signal f2 from self-oscillator circuit 92 can be found by the following $$f2 = f20/\sqrt{1 + B \cdot \rho} \quad (10)$$

wherein f20 is the resonant frequency of the crystal tuning fork oscillator under vacuum and B is a constant and $\rho$ is the density of the circumferential gas.

Figure 18:
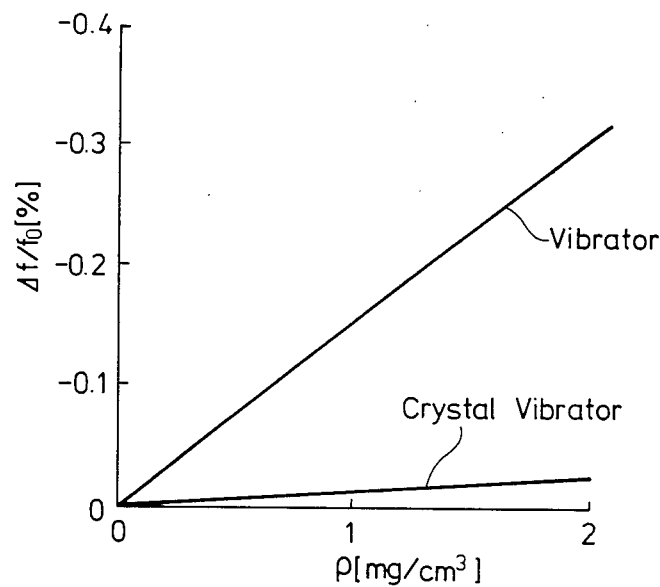
FIGS. 18 and 19 are diagrams depicting compensating effects provided by the compensating device in FIG. 17.

FIG. 18 is a diagram showing rates of variations in resonant frequencies f1,f2 relative to the density $\rho$. The data shown in FIG. 18 were obtained using the FIG. 17 embodiment with the vibrator 3 shown in FIGS. 7A,7B,7C and a tuning fork 91 formed of crystal.

In the graph of FIG. 18, the vibration rate of resonant frequency of the vibrator 3, which is based on the varations in density shows 0.32% when the density is 2 mg/cm$^3$, and the variation rate of the crystal 91 is approximately 0.03% ($\rho = 1.2 - 2.4$ mg/cm$^3$ is equivalent to 1-2 atmospheric pressures).

On the basis of equation (10), density $\rho$ can be obtained by the following $$\rho = (1/B)\{(f20/f2)^2 - 1\} \quad (11)$$

On the other hand, the frequency signal $\Delta f1$ for compensating the resonant frequency f1 of the vibrator 3, is calculated according to the following $$\Delta f1 = [f10/\sqrt{1 + A \cdot \rho}] - f10 \quad (12)$$

The signal processing circuit 85 effects arithmetic operations on the basis of the equations (10) and (11), and simultaneously compensate signal frequency f1 by $\Delta f1$. Thereafter, circuit 85 outputs pressure signal f, which has been compensated for the density of the circumferential gas, to an indicator 9.

Figure 19:
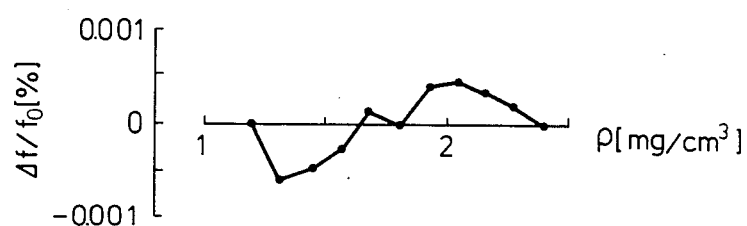

FIG. 19 is a diagram showing the relationship between the density and the variation rate of the resonant frequency after compensating for the density of the circumferential gas, in the signal processing circuit 85. As a result of effecting arithmetic operation for compensating for the density, there is improvement of more than 2 digits of variation rate, relative to the density of the resonant frequency.

In each of the above embodiments, if the inside of shell 2, in which vibrator 3 is installed, remains evacuated, it is feasible to measure the absolute pressure. In this embodiment, there is used a tuning fork oscillator formed of crystal. However, other materials may be used, such as metal, for the oscillator 91.

Furthermore, FIG. 17 shows a configuration wherein two frequency signals f1, f2 can be applied to the signal processing circuit 85. However, it is also possible to use a configuration wherein the two frequency signals can be applied to a pulse duration modulation (PWM) circuit located on the input side of signal processing circuit 85, to effect pulse duration modulation on such frequency signals, and then to feed the pulse width signal produced therein to the signal processing circuit 85.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A pressure measuring apparatus comprising a diaphragm to which pressure to be measured is applied; and a resilient vibrator linked to said diaphragm and driven by a force produced by said diaphragm in response to said pressure, wherein said diaphragm comprises a peripheral circumferential portion, a central fixing portion, and a non-planar intermediate portion therebetween, with said fixing portion having an edge part secured to said vibrator at a non-perpendicular angle, wherein said peripheral portion and said fixing portion comprise rising edge portions of predetermined dimensions, said rising edge portions being attached parallel to said vibrator.

2. The apparatus of claim 1, wherein said resilient vibrator is positioned in a vacuum as a reference pressure with the pressure to be measured being applied to said diaphragm.

3. A pressure measuring apparatus comprising a diaphragm to which pressure to be measured is applied; and a resilient vibrator linked to said diaphragm and driven by a force produced by said diaphragm in response to said pressure, wherein said diaphragm comprises a peripheral circumferential portion, a central fixing portion, and a non-planar intermediate portion therebetween, with said fixing portion having an edge part secured to said vibrator at a non-perpendicular angle, wherein said diaphragm comprises a first part having said circumferential peripheral portion, and a second part of a rigid tabular disk connected to said vibrator.

4. The apparatus of claim 3, wherein a back plate is disposed in close proximity to said disk.

5. A pressure measuring apparatus comprising a diaphragm to which pressure to be measured is applied; and a resilient vibrator linked to said diaphragm and driven by a force produced by said diaphragm in response to said pressure, wherein said diaphragm comprises a peripheral circumferential portion, a central fixing portion, and a non-planar intermediate portion therebetween, with said fixing portion having an edge part secured to said vibrator at a non-perpendicular angle, wherein said resilient vibrator comprises a pair of vibrating pieces which are disposed parallel to each other with a central axis, a pair of end pieces joining respective end portions of said vibrating pieces, installing members, and flexure members for linking said end pieces to said installing members, and wherein said flexure members are circular cylindrical in shape with a length l within the range of $l = (\lambda/4)(1 \pm 0.5)$ with respect to wavelength $\lambda$ of natural frequency of said vibrating pieces.

6. The apparatus of claim 5, wherein said pair of said vibrating pieces are separated from each other by a distance of at least 1.5 mm.

7. A pressure measuring apparatus comprising a diaphragm to which pressure to be measured is applied; and a resilient vibrator linked to said diaphragm and driven by a force produced by said diaphragm in response to said pressure, wherein said diaphragm comprises a peripheral circumferential portion, a central fixing portion, and a non-planar intermediate portion therebetween, with said fixing portion having an edge part secured to said vibrator at a non-perpendicular angle, further comprising a tuning fork oscillator having a suitable frequency to compensate the resonant frequency of said vibrator as affected by density of any gas surrounding said vibrator.

* * * * *